United States Patent [19]

Brown et al.

[11] Patent Number: 4,479,033

[45] Date of Patent: Oct. 23, 1984

[54] TELEPHONE EXTENSION SYSTEM UTILIZING POWER LINE CARRIER SIGNALS

[75] Inventors: William M. Brown, Acton; Robert T. Dunn, Bedford, both of Mass.

[73] Assignee: Astech, Inc., Bedford, Mass.

[21] Appl. No.: 363,063

[22] Filed: Mar. 29, 1982

[51] Int. Cl.³ .......................................... H04M 11/00
[52] U.S. Cl. ................................................ 179/2.51
[58] Field of Search ................ 179/2.51, 2 A, 2 AM, 179/3, 4, 2 EA; 370/69–71, 76; 340/310 R, 310 A

[56] References Cited

U.S. PATENT DOCUMENTS

| | | | |
|---|---|---|---|
| 2,654,805 | 10/1953 | Derr | 179/2.5 |
| 3,045,066 | 7/1962 | Beuscher . | |
| 3,280,259 | 10/1966 | Cotter | 179/2.51 |
| 3,390,234 | 6/1968 | Glidden | 179/5 |
| 3,876,984 | 4/1975 | Chertak | 340/152 R |
| 3,922,664 | 11/1975 | Wadsworth | 340/276 |
| 3,925,763 | 12/1975 | Wadhwani et al. | 340/164 R |
| 3,949,172 | 4/1976 | Brown et al. | 179/2.51 |
| 3,980,954 | 9/1976 | Whyte | 325/48 |
| 4,058,678 | 11/1977 | Dunn et al. | 179/2.51 |
| 4,319,091 | 3/1982 | Meri | 179/2 A X |
| 4,323,882 | 4/1982 | Gajjar | 340/310 R |

FOREIGN PATENT DOCUMENTS 922397 3/1973 Canada ............................. 340/109
1393424 5/1975 United Kingdom .

Primary Examiner—Gene Z. Rubinson
Assistant Examiner—W. J. Brady
Attorney, Agent, or Firm—Hamilton, Brook, Smith & Reynolds

[57] ABSTRACT

A power line telephone extension system for carrying electrical signals between a subscriber's telephone line of a conventional telephone communication system and the subscriber's remote transmit-receiver device, (such as a conventional extension telephone), over the AC electric power wires available to the subscriber which includes: master linking circuits for processing signals between the subscriber's telephone line and the AC power wires; extension linking circuits for processing signals between the AC power wires and the subscriber's remote transmit-receive device, such as a conventional extension telephone; and a directional coupler circuit electrically coupling the remote transmit-receive device and the telephone line. The extension system is quite suitable for use with the presently available, well known, conventional extension telephone that plugs in by the plug (modular or 4 prong) provided therewith, to the directional coupler. Thus, the extension phone can then be used along with the extension linking circuits at any location at the subscriber's premises where there is access to the AC power wires.

9 Claims, 13 Drawing Figures

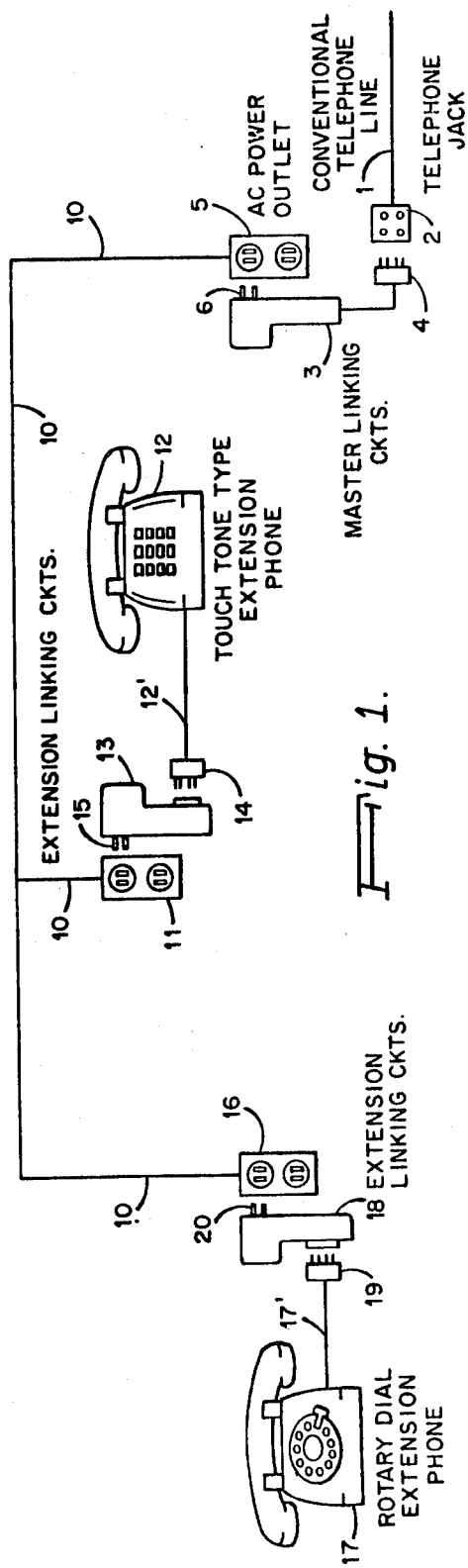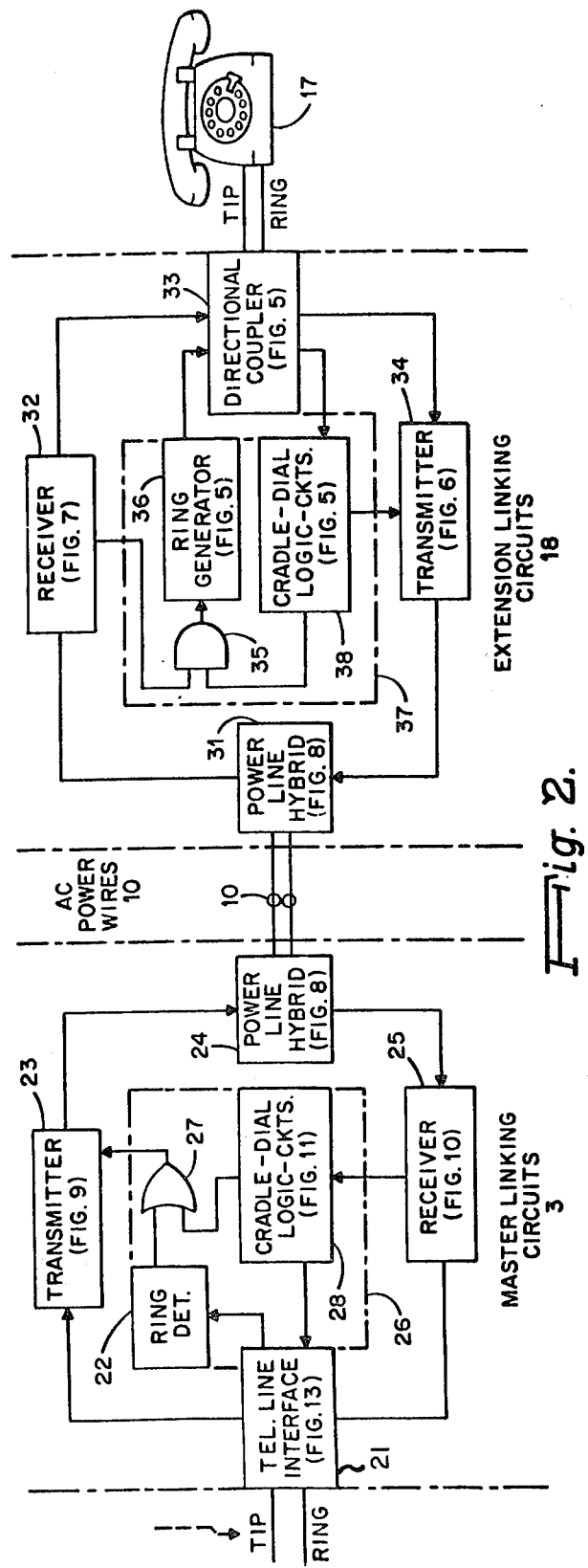
Fig. 1.
Fig. 2.

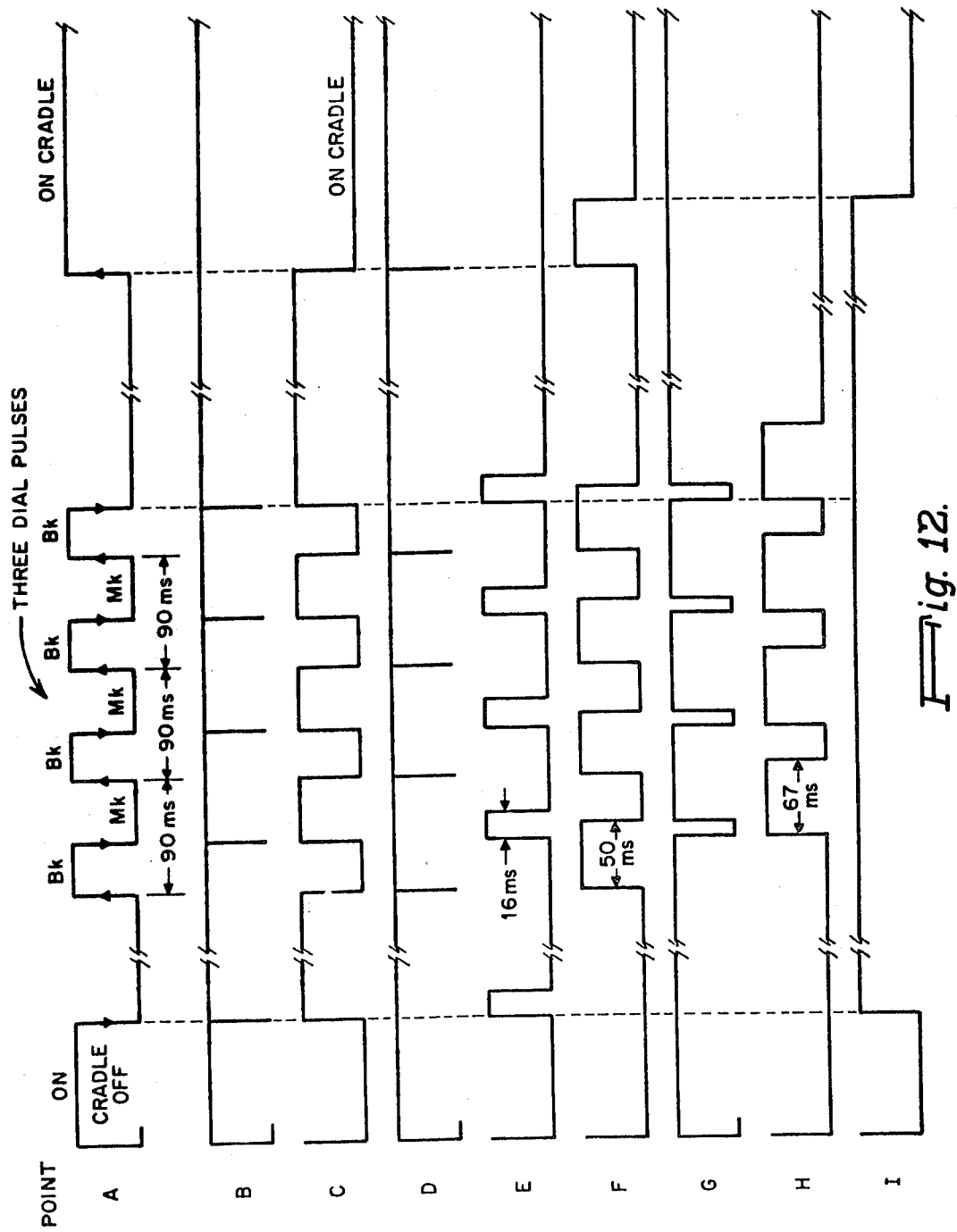

TELEPHONE EXTENSION SYSTEM UTILIZING POWER LINE CARRIER SIGNALS

BACKGROUND OF THE INVENTION

The present invention relates to apparatus for remote signaling to a telephone line over available AC power wires. More particularly, the present invention provides apparatus for communicating over AC power wires between a conventional extension telephone and a conventional telephone line.

U.S. Pat. No. 3,949,172 which issued Apr. 6, 1976, entitled Telephone Extension System Utilizing Power Line Carrier Signals, and in which the present co-inventors are also co-inventors, describes a system for doing very much the same thing as the system described in the present application. That patent describes a special extension telephone that is used by the subscriber in a conventional manner, but, is not at all conventional in construction and electrical design. In the patent, the extension telephone includes a hand set with a microphone at one end and an earphone at the other with separate lines from each, the line from the microphone feeding a transmitter and the line to the earphone coming from a receiver. In addition, the special extension telephone includes a separate line for cradle switch signals, dial signals and transfer/hold signals. Clearly, all of this is not in accordance with the construction of a conventional subscriber's extension telephone, such as presently used in great numbers throughout the world and which are frequently used by plugging into a telephone wall jack that is the well known four-prong type wall jack or the relatively newer modular type wall jack. It is an object of the present invention to provide a power line telephone extension system for coupling signals between a conventional telephone line and a conventional extension telephone, so that any of the great many of conventional extension telephones that are available can be used with the system. The only requirement is that the conventional extension telephone operate properly when it is used in the conventional manner such as by plugging into an available telephone wall jack.

Other kinds of signaling between a conventional telephone line and various kinds of transmit-receive devices over available AC power wires are described in U.S. Pat. No. 4,058,678, entitled Remote Signaling to a Telephone Line Using Power Line Carrier Signals, and in which the present co-inventors are also co-inventors. That patent describes a system whereby appliances or other electrical equipment plugged into the AC power wires at a premises can be controlled by an incoming telephone call to the premises. The incoming telephone call feeds coded signals to the telephone at the premises and these signals are coupled to the AC power wires and received at the location of an appliance which is also plugged into the AC power wires. The received signals can, for example, turn the appliance on or off. The same patent describes a system for signalling an alarm from the premises. The alarm signal, for example, from a fire detector in the premises is transmitted over the AC power wires in the premises to the telephone where it initiates operation of the telephone to call a predetermined number and deliver it a pre-recorded message. Clearly, neither of the systems described in that patent both receives and transmits information signals.

It is an object of the present invention to provide a system that is capable of full duplex operation so that the system can simultaneously transmit and receive information signals during the interval of a telephone call.

SUMMARY OF THE INVENTION

In accordance with the present invention, duplex communication with a telephone subscriber's telephone line is extended to a remote transmit-receiver device, via the available AC power wires, enabling full duplex operation for signaling between the remote device and the subscriber's telephone line. The remote device may be a conventional extension telephone or it may be a data link, or a utility meter specially equipped to respond to interrogation signals from the telephone line by transmitting back data signals. In all embodiments of the present invention, the system provides for full duplex signaling capabilities.

The preferred embodiment, described in detail herein, is a telephone extension system for coupling a conventional telephone line to a conventional extension telephone, using the available AC power wires for transmitting voice or data signals simultaneously in both directions therebetween. In this embodiment, any conventional extension telephone that operates properly in its ordinary use can be used. The telephone may be the rotary dial or the Touch Tone type and the system is designed so that the extension telephone plugs into it, just as the extension phone plugs into a telephone wall jack in conventional use. In order to enable using a conventional extension telephone in this system, a transmitter and receiver are provided at the extension location. These are part of the circuits already referred to as the extension linking circuits. The conventional extension telephone connects to these linking circuits via a directional coupler. More particularly, the directional coupler is a two to four terminal hybrid network.

It is one object of the present invention to provide a telephone extension system communicating over AC power wires that are normally available where an extension telephone is used, enabling the use of a conventional extension telephone in the system.

It is another object to provide for a conventional telephone, a system for communicating with a conventional telephone line via available AC power wires.

It is another object to provide for a conventional telephone data link, a system for communicating with a conventional telephone line via the available AC power wires.

It is another object to provide a full duplex communication system for use with a transmit-receive device for communicating with a conventional telephone line through available AC power wires.

In conjunction with any of the above objects, it is a further object to provide a system requiring no connection either electrical, mechanical or acoustical to any other telephone connected to the conventional telephone line, It is a further object in conjunction with the foregoing to provide for use with a conventional extension telephone, a compact portable unit equipped with a conventional AC power plug for connection to the AC power wires at any conventional outlet thereof.

It is further object in conjunction with the above to provide such equipment for use with a conventional extension telephone that is operable to receive incoming calls and to place calls as is done with the on line telephone, with or without another telephone on the line.

Other objects, features and advantages of the present invention will be apparent in view of the following descriptions of specific embodiments which represent the best known uses of the invention and are described herein with reference to the drawings.

DESCRIPTION OF THE DRAWINGS

FIG. 1 is a pictorial representation of a telephone extension system incorporating features of the present invention wherein one or more conventional extension telephones of the rotary dial or Touch Tone type are used, each connected to the system by a conventional four prong or modular telephone plug;

FIG. 2 is an electrical block diagram showing the complete system for a single conventional extension telephone, showing the principle electrical subsystems of the master linking circuits and the extension linking circuits;

FIG. 12 shows waveforms A to I as illustrations of signals in the master cradle-dial decoder circuit of FIG. 11 as an aid to understanding that circuit.

DESCRIPTION OF AN EMBODIMENT OF THE INVENTION

Figure 3:
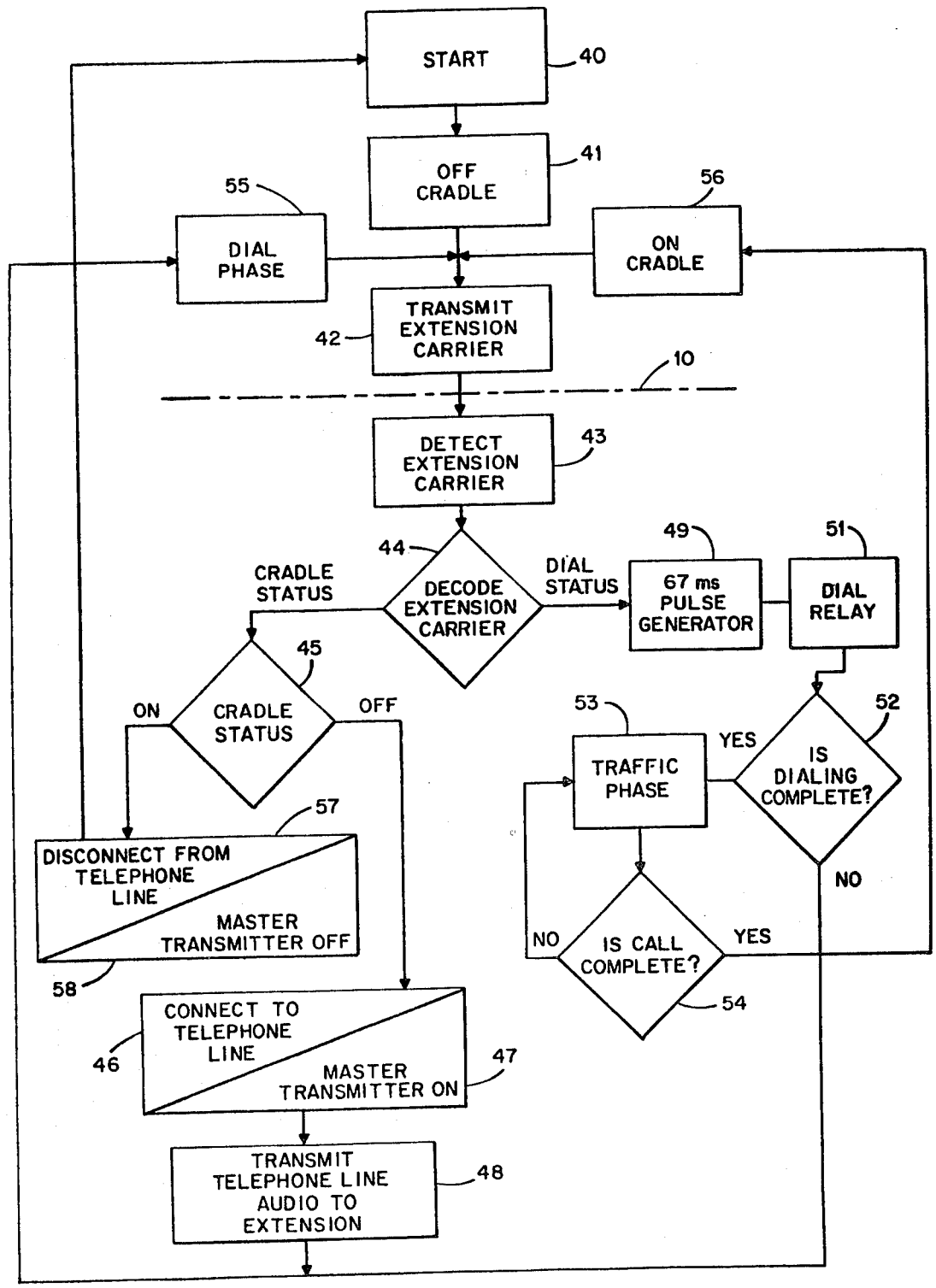
FIG. 3 is a logic diagram showing the sequence of operation of the system to originate a call from the conventional extension telephone.

The best known use of the present invention is the embodiment illustrated pictorially in FIG. 1. This use provides conventional extension telephones which may be either rotary dial or Touch Tone types at several locations along the Ac power wires available at a telephone subscriber's premises. This is the best known use of the invention and is described in detail for that reason. Other uses include duplex signalling to any transmit-receive device over the AC power wires by a conventional telephone line. Other uses also include duplex signaling between specially equipped meters such as an electric meter or other utility meter. The meter is interrogated by an incoming telephone call and, in response, transmits meter data to the caller over the telephone line. As shown in FIG. 1, the subscriber's premises has a telephone line which usually consists of four wires called the tip line, the ring line, earth ground and a fourth line for special party line ringing circuits. The ring line is usually red, the tip line is green, the earth ground is black and the fourth line is yellow. As a rule, three of these lines, the tip, ring and ground, connect to "on line" telephones at the premises and also connect to wall jacks.

In a conventional system, extension telephones connect to the telephone lines at the wall jack by merely plugging them in and any such extension phones can engage an incoming telephone call and can place a telephone call to the telephone line. The embodiment of the present invention described herein provides the same service and allows use of the same conventional extensions telephone. In addition, the present invention allows the extension telephone to be used at any of the available AC power outlets at the premises and so the extension telephone is not restricted to use where a telephone wall jack is provided.

In FIG. 1 the subscriber's telephone line 1 is connected to the telephone wall jack 2. The master linking circuits 3 plug into the jack 2 by a conventional telephone plug 4 and also plug into a nearby AC power outlet 5 by an AC power plug 6. By these connections, the subscriber's telephone line 1 is linked to the subscriber's AC power wires denoted generally at 10. At any number of other AC power outlets on the AC power wires 10, conventional extension telephones can be used. For example, at outlet 11, a conventional Touch Tone extension telephone 12 is coupled via extension linking circuits 13. The telephone 12 plugs into the circuits 13 by a conventional telephone plug 14 and the circuits 13 plug into the AC power outlet 11 by AC power plug 15. Similarly, at another AC power outlet 16 a conventional rotary dial extension telephone 17 plugs into extension linking circuits 18 via the telephone plug 19 and the linking circuits 18 plug into the AC power outlet 16 by AC power plug 20. Both of the extension linking circuits 13 and 18 may be identical to each other and so they may be interchanged and both accommodate a dial telephone or a Touch Tone telephone of conventional design.

In operation, an incoming telephone call ring signal in the telephone line 1 is processed through the linking circuits 3, 13 and 18 to the extension telephones 12 and 17 causing them to ring. This incoming call can be answered by either of the telephones or both can simultaneously engage the incoming call and communicate with each other. Thus, the incoming caller and telephones 12 and 17 can conference together and the incoming call is not terminated at the subscriber's location until both telephones are cradled. Furthermore, either telephone can place a call to the telephone line, just as any conventional phone places a call, by uncradling the phone and signalling the call number by touch tone or dial; and after one of the phones has completed signaling, the other can be uncradled and join in the call. Thus, operation of the system illustrated in FIG. 1 is much the same as conventional extension telephone operation, with the added feature and advantage that the extension telephone can be located in the premises at any convenient AC power outlet.

Turning next to FIG. 2 there is shown an overall electrical block diagram of the system showing the master and extension linking circuits equivalent to 3 and 13 or 18 in FIG. 1, the AC power line and a single extension phone which can be either a Touch Tone type, like 12, or rotary dial, like 17. Each of the block sub-systems shown in FIG. 2 are shown also in greater detail in other figures that are denoted in the blocks. Some parts of these sub-systems or blocks are shown in more than one of the detail figures. This is done intentionally as an aid in understanding the details. Wherever a given part appears in any figure, it bears the same reference number.

The master linking circuits 3 include a telephone line interface circuit 21 that connects directly to the subscriber's telephone line 1, via plug 4 and jack 2. Since the tip and ring lines of the telephone line 1 are the two lines of particular interest, only those lines are identified throughout the diagram. Interface 21 feeds ring detector circuit 22 and master transmitter 23 which, in turn, feeds ring and audio signals through power line hybrid 24 to the AC power wires 10. The hybrid 24 is a reactive circuit and so coupling to the AC power wires is inductive or capacitive.

The master receiver 25 receives signals from the power line hybrid 24 that originate from extension telephone 17 and feeds the received signals through the interface 21 to the telephone line 1. Among the signals received originating from the extension telephone is the on/off-cradle (hook) signal that is fed from receiver 25 to the master ring and cradle-dial decoder circuits 26. These circuits detect ring signals from the telephone line, control cradle and dial relays that function in the telephone line interface 21 and turn the master transmitter 23 on and off. In particular, these circuits perform logic functions that include turning on the master transmitter following detection of a ring signal on the telephone line and detection of the extension telephone off-cradle signal from receiver 25. They control coupling the telephone line, via interface 21, to the transmitter and receiver when the off-cradle signal is received and impose dial impulses on the telephone line in response to dial pulse signals received from extension phone 17. If the extension telephone is a Touch Tone type rather than rotary dial type, signaling tones are received by the master receiver and these are fed directly to the telephone lines through interface 21.

The extension linking circuits 18 are also shown in FIG. 2. These circuits include the power line hybrid 31 that is constructed substantially the same as the master power line hybrid 24. All signals transmitted by master transmitter 23 and fed through hybrid 24 over the AC power line 10 are fed via the extension power line hybrid 31 to the extension receiver 32. The first signal received by receiver 32 is the first signal transmitted by master transmitter 23; it is the ring signal. That ring signal is detected by the receiver and fed through NAND circuit 35 to the ring generator 36 which are both in the extension ring and cradle-dial decoder circuits 37. Also, in these decoder circuits 37 is the cradle and dial logic circuit 38.

The first received signal at receiver 32, the ring signal, received while the extension telephone is on-cradle, turns on the ring generator 36 producing a signal suitable for energizing the ring circuit in the extension phone. When the extension phone is answered by lifting the handset, the off-cradle signal is produced and fed to the cradle and dial logic circuits 38, via directional coupler 33, turning on transmitter 34 and sending a signal to NAND circuit 35 that shuts it off so the ring signal from generator 36 stops. Thereafter, audio signals from the telephone line, received at 32 are fed to the extension phone through the directional coupler 33 and audio signals from the phone are fed to transmitter 34 through the coupler.

The directional coupler 33 for this embodiment is preferably a two to four terminal network comprising a coil transformer. As already mentioned, details of the circuit blocks shown in FIG. 2 are revealed in the figures denoted in the blocks. Clearly, the overall system shown in FIG. 2 is substantially symmetrical with respect to the AC power channel 10. The master and extension linking circuits 3 and 18 are symmetrical with respect to each other. For example:

| Master Linking Circuits | Extension Linking Circuits |
| --- | --- |
| telephone line interface 21 | direction coupler 33 |
| transmitter 23 | transmitter 34 |
| receiver 25 | receiver 32 |
| master ring and cradle-dial decoder circuits 26 | extension ring and cradle-dial decoder circuits 37 |
| power line hybrid 24 | power line hybrid 31 |

As will be seen from detailed descriptions of these circuit, some of the master linking circuits are interchangeable with their equivalents in the extension linking circuits. For example: the power line hybrids 24 and 31 can be identical; the transmitters can be the same except they are tuned to different frequencies, the master carrier frequency and the extension carrier frequency; and the receivers can be the same except their input filters are tuned to different frequencies.

Operation

Operation of the telephone linking system to originate a call from the extension telephone is illustrated by the functional diagram in FIG. 3. The procedure for originating a call begins with lifting the hand set off-cradle (41), transmitting extension carrier frequency to the master (42) where the extension carrier is detected (43) and initiating decoder status in the master (44). Immediately, the off-cradle status is decided (45), initiating the decision to connect to the telephone line (46) and turn on the master transmitter (47) which transmits any audio on the telephone line to the extension (48). Immediately following the off-cradle status decision (44), dial status follows about 67 ms later (49) at the dial relay (51). A decision is made whether dialing is completed (52) and when it is, traffic phase commences (53) and continues so long as the telephone call is not terminated (54). If dialing is not completed (52) and the call is not finished (54), then the dial phase at the extension continues (55). On the other hand, when the call is finished (54), (whether dialing is completed or not), the extension is back to the on-cradle mode (56). When the cradle status is on-cradle, the system disconnects from the telephone line loop (57) returning the function sequence to the start at (40) and the master transmitter is turned off (58). This function sequence is then ready to begin again.

Figure 4:
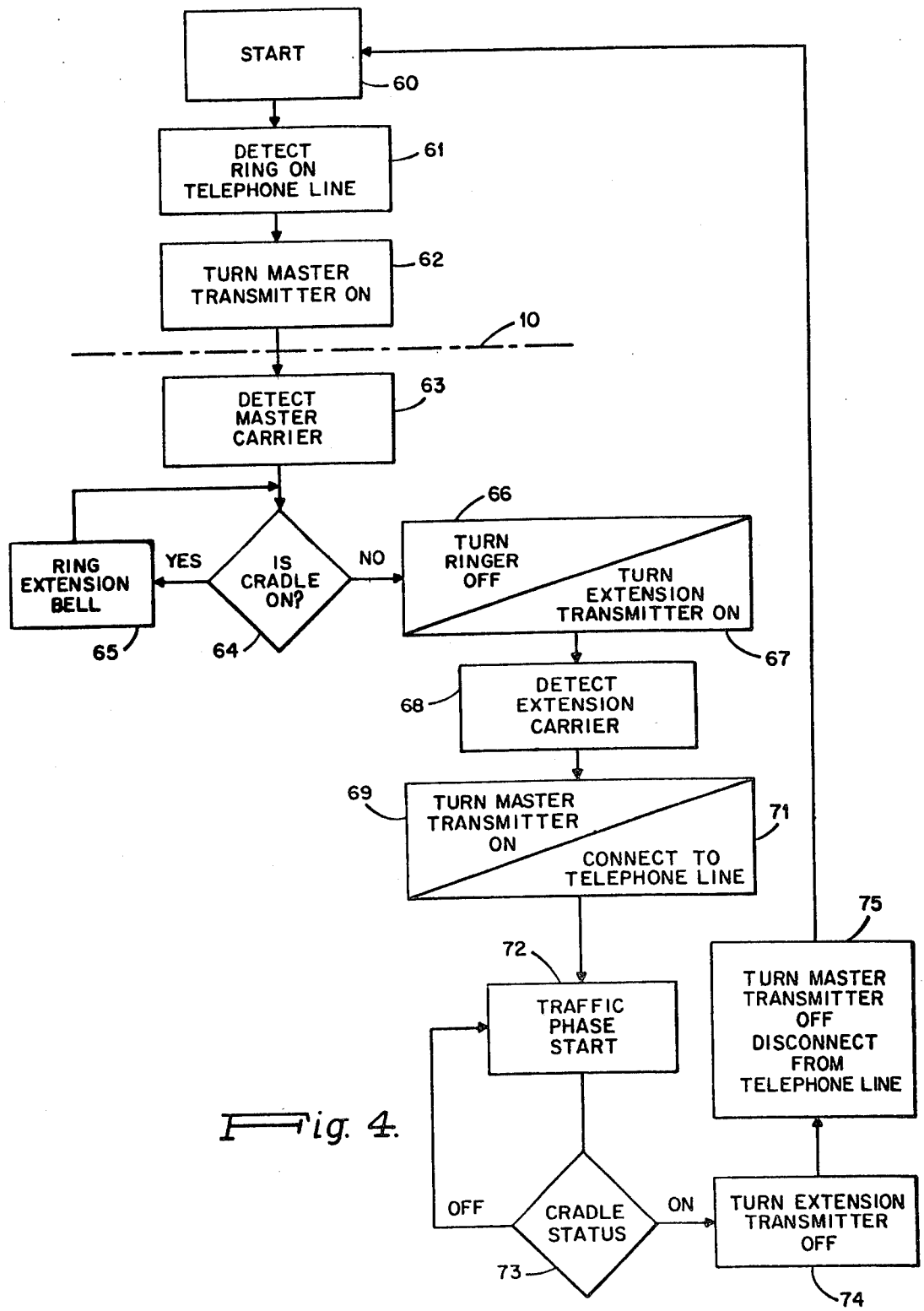
FIG. 4 is a logic diagram showing the sequence of operation of the system responding to an incoming call on the telephone line.

The function sequence for receiving an incomimg call on the telephone line is shown by FIG. 4. This begins at the master by detecting the ring signal on the telephone line (61) which turns on the master transmitter (62). Then, at the extension, the master carrier is detected (63), initiating the decision whether the extension phone is on or off-cradle (64) and if on-cradle, the extension rings (65) and it continues to ring so long as ring signals are received and so long as the extension is on cradle.

When the extension goes off-cradle, the ringer is turned off (66) and the extension transmitter is turned on (67). This is detected at the master (68), turning on the master transmitter (69) and at the same time connecting the system to the telephone line loop (71) placing the system in the traffic phase (72) which continues as long as cradle status (73) is off-cradle. When cradle status changes to on-cradle, the extension transmitter turns off (74) which immediately turns off the master transmitter (75) and disconnects the system from the telephone line loop, returning the system to start (60). Clearly the start (40) and (60) conditions of the system are the same and some of the other functions shown in FIG. 3 have their equivalence in FIG. 4 although reference numbers are different.

Extension Linking Circuits

Figure 5:
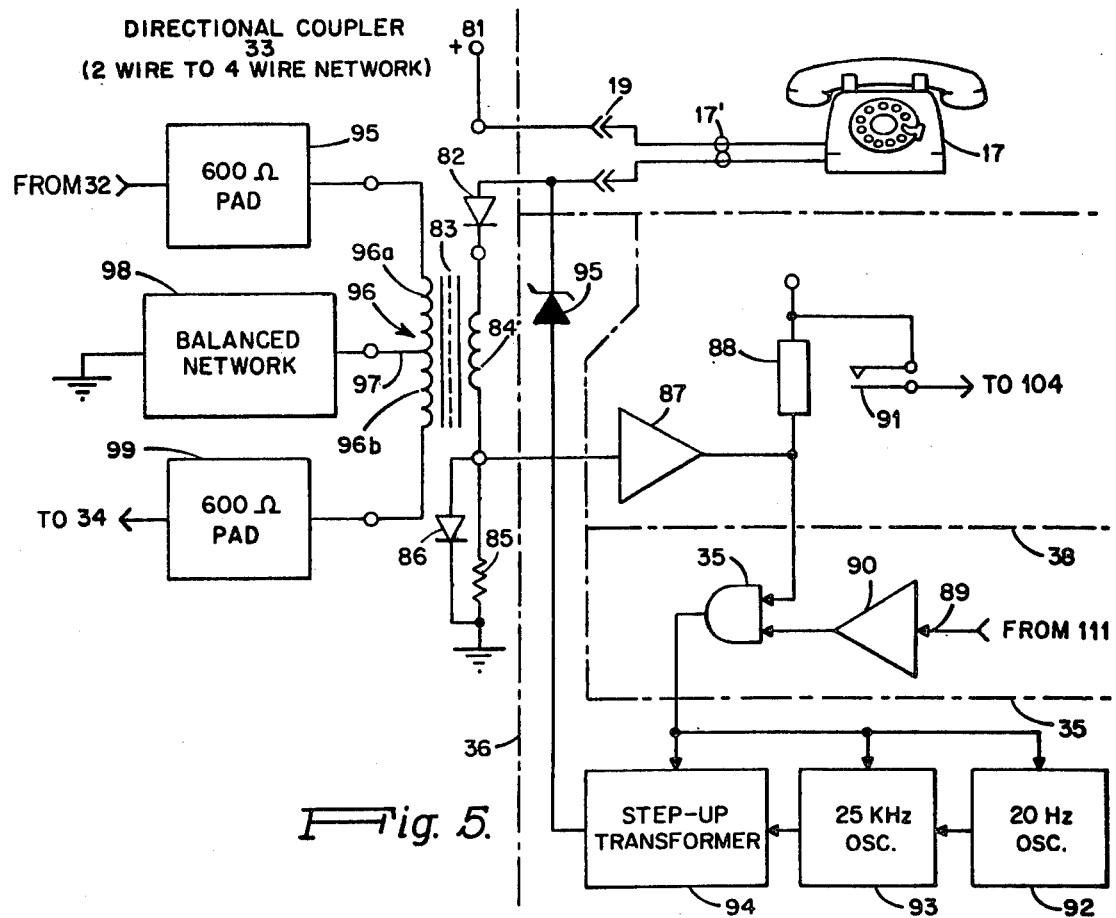
FIG. 5 shows details of the directional coupler and other subsystems of the extension linking circuits that connect the conventional extension telephone to the power wires.

Details of the extension linking circuits 3 are illustrated by FIGS. 5 through 8. These details show suitable construction of the circuits to accomplish the performance already described with reference to FIGS. 1 through 4. Turning first to FIG. 5 there is shown details of directional coupler 33 and the extension ring and cradle-dial decoder circuits 37. These circuits include NAND circuit 35, ring generator 36 and the extension cradle-dial logic circuits 38. As already mentioned, the same extension linking circuits are provided for both the conventional rotary dial and Touch Tone type telephone. The rotary dial type phone makes use of all of the linking circuits, whereas the Touch Tone type need not. In fact, Touch Tone operation is simpler than rotary dial operation. Hence, only the rotary dial operation is described with reference to these figures and shown as the extension telephone 17 in FIG. 5. For reasons already explained, only the tip and ring lines of the extension phone are shown connecting by telephone plug 19 to the linking circuits at the directional coupler 33.

A power supply in the extension linking circuits (see FIG. 14) provides DC voltages throughout the circuits, including +12 volts DC at 81 to the ring line of the extension phone and when it is off-cradle, that voltage is fed over the tip line through diode 82 to one side of the two to four wire transformer 83. This feeds a DC current through coil 84 of the transformer, to ground through resistance 85 and diode 86, which turns on relay drive amplifier 87 that powers relay 88 and also feeds an inhibit signal level to NAND circuit 35. So long as NAND 35 is inhibited, master carrier signals detected by the extension receiver 32 that indicate a ring signal present (see FIG. 7), are inhibited and do not turn on the ring generator 36. The presence of these ring signals is indicated by a signal level in line 89 that is fed to NAND 35 by driver 90. When NAND 35 is inhibited, relay 88 is energized, closing the relay switch 91 that feeds DC voltage to transmitter 34 to turn the transmitter on.

Before extension phone 17 goes off-cradle, and a ring signal is received by receiver 32, NAND 35 is not inhibited and so driver circuit 90 turns on ring generator 36, energizing the 20 Hz and the 25 KHz oscillators 92 and 93 and step-up transformer 94 which produces a 20 Hz ring signal carried by 25 KHz at 120 volts Rms. This ring signal is fed by Zener diode 95 to the tip line of extension telephone 17, driving the bell circuit therein. The 25 KHz oscillator is provided to carry the 20 Hz signal so that it can be stepped up in voltage by a relatively small transformer 94 to a sufficient level to drive the bell circuit in the extension telephone. The 25 KHz does not, however, pass diode 82, because it remains back biased until the +12 volts DC is applied at off-cradle. Thus the transformer coil 84 is protected from the generated ring signal of relatively high voltage.

When the extension phone, in response to the ringing, goes off-cradle, NAND 35 is inhibited and the extension transmitter 34 is turned on. This feeds extension carrier to the master receiver 25 (see FIG. 10) which detects the carrier and signals this to the master ring and cradle-dial decoder circuits 26 (see FIG. 11). The master decoder circuits in response to this energize the cradle relay in the telephone line interface 21 connecting the system to the telephone line loop (see FIG. 13). At the same time, the master transmitter, which is turned off between each ring signal, is turned on again (see FIG. 11). At this point in the operation, the entire system is connected to the telephone line loop and in the traffic phase of operation.

In the traffic phase, audio signals on the telephone line originating from another telephone are transmitted from the master over the AC power wires to the extension, received and de-modulated by extension receiver 32 and fed through receiver pad 95 to one end of coil 96 to transformer 83. A center tap 97 on this coil connects to the ground via a balanced network 98 and so the received audio energizes one side, 96a, of the coil 96. By the transformer coupling action, a corresponding audio current is produced in coil 84 of the transformer. These audio signals from the telephone are coupled by the transformer action to the other half, 96b of coil 96 between the balanced network 98 and 99 that feeds the input of extension transmitter 34. Thus, audio signals in both directions are produced in the tip line to the telephone and these are separated by the directional coupling action of two wire to four wire network 33. Thus, during the traffic mode of operation transmission of audio signals between the conventional extension telephone 17 and the conventional telephone line 1 is full duplex. Between them, the incoming and outgoing audio signals are carried by separate frequency channels, the master frequency channel called the master carrier and the extension frequency channel called the extension carrier.

Figure 6:
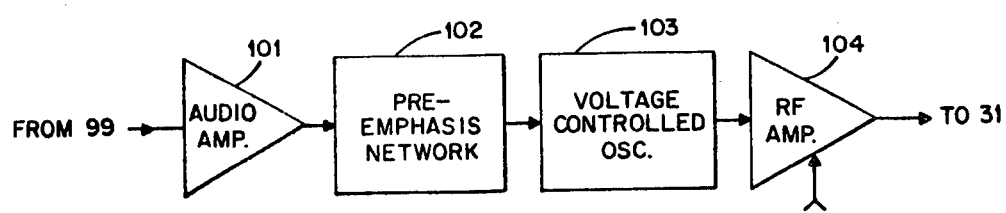
FIG. 6 is an electrical block diagram showing elements of the extension linking circuit transmitter.
Figure 7:
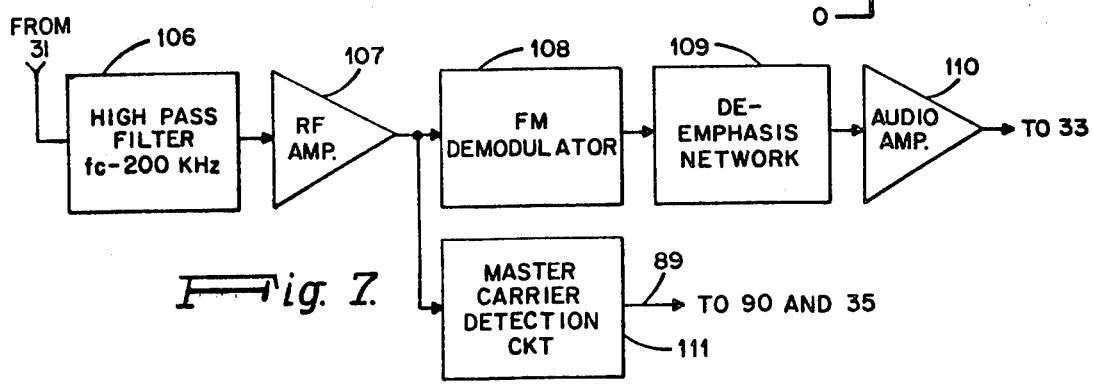
FIG. 7 is an electrical block diagram showing elements of the extension linking circuit receiver-demodulator.

The extension transmitter and receiver are shown by FIGS. 6 and 7, respectively. In FIG. 6, the audio from directional coupler 33 is fed to audio amplifier 101 for amplification and then to pre-emphasis network 102 that emphasises the amplitude of the higher audio frequencies and this is fed to voltage control oscillator 103 for which the center frequency may be 75 KHz. The output of the oscillator is fed to gated RF amplifier 104 that is turned on when power supply voltage is applied from relay switch 91. The output of amplifier 104 is extension carrier frequency centered at 75 KHz, modulated by the audio and modulation index may be about 1.5 at 25 milliwatts. This is fed to power line hybrid circuit 31, shown in detail in FIG. 8.

FIG. 7 shows details of the extension receiver 32. From power line hybrid 31 master carrier frequency that may be centered at 250 KHz, modulated by audio from the telephone line is fed through high pass filter 106 to RF amplifier 107 where it is amplified and then demodulated by demodulator 108 and fed through de-emphasis network 109 to audio amplifier 110, through pad 95 and directional coupler 33 to the extension telephone. The network 109 tends to de-emphasize higher frequencies in this audio signal in compensation for pre-emphasis imposed in the master transmitter 23. The output of amplifier 107 is also fed to carrier detection circuit 111 wherein the presence of master carrier frequency is first detected as the ring signal and fed from there as a signal level in line 89 to NAND circuit 35.

Figure 8:
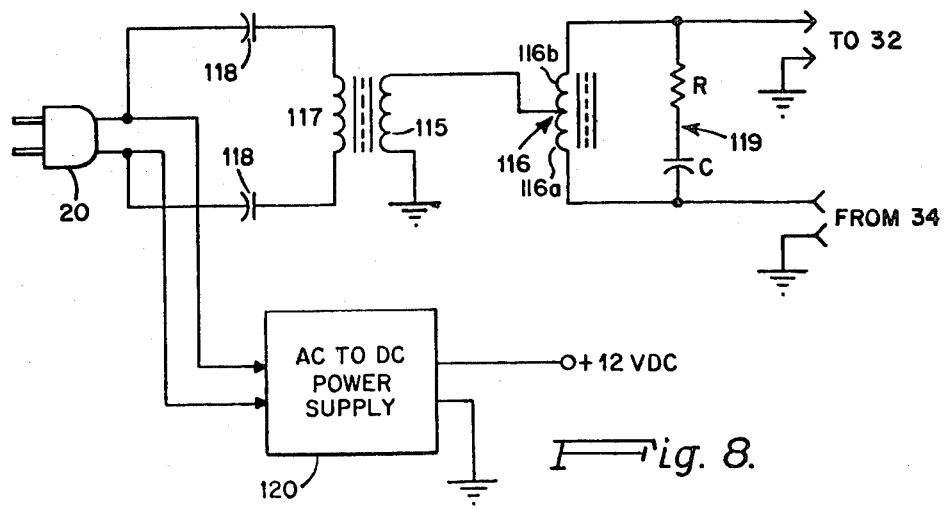
FIG. 8 is an electrical diagram showing the power line hybrid circuit, one each for connecting the master and extension linking circuits to the AC power wires.

Power line hybrid 31 is shown in detail by FIG. 8. the master power line hybrid 24 is constructed in the same way, hence, only hybrid 31 is described. From extension transmitter 34 the frequency modulated extension carrier centered at 75 KHz is across transformer coil 115 and one half, 116a, of center tapped transformer coil 116, both of which couple inductively with coil 117 that is across the terminals of AC power plug 20 via oil microfared capacitors 118. Similarly, the other side, 116b, of coil 116 in series with coil 115 is across the input of extension receiver 32. An RC circuit across coil 116 includes a high resistive impedance and capacitive impedance to compensate for inductive coupling between the transmitter and receiver and insure very low coupling between them (down about 35 dB).

In FIG. 8, an Ac to DC power supply 120 also couples to the AC power line via AC power plug 19, providing DC power supply throughout the extension linking circuits.

Master Linking Circuits

Figure 9:
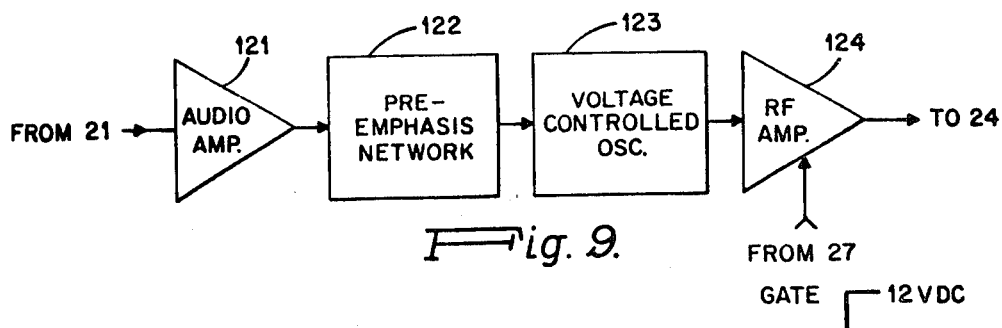
FIG. 9 is an electrical block diagram showing elements of the master linking circuit transmitter.
Figure 10:
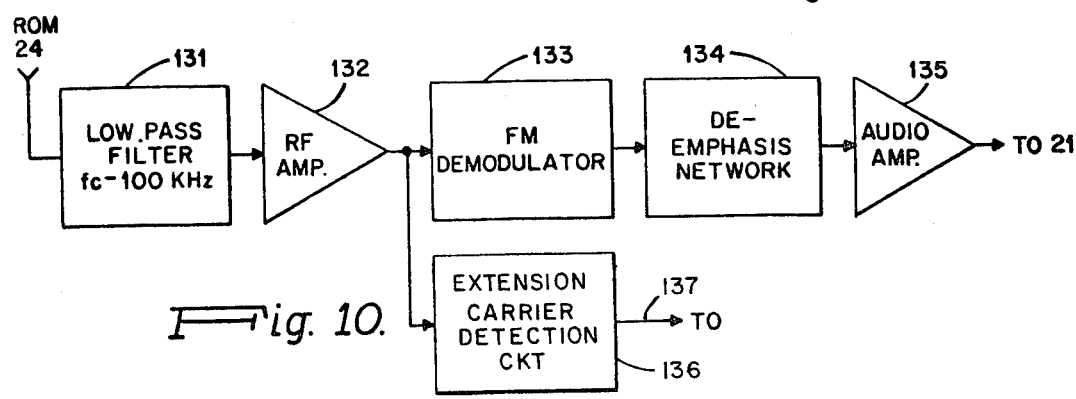
FIG. 10 is an electrical block diagram showing elements of the master linking circuit receiver-demodulator.

FIGS. 9 and 10 show details of the master transmitter 23 and receiver 25. The master transmitter in FIG. 9 is constructed the same as the extension transmitter shown in FIG. 6, except the voltage control oscillator operates at a higher frequency. Ring and audio signals from the telephone line 1 fed through the interface 21 are amplified by audio amplifier 121 and fed through pre-emphasis network 122 to voltage control oscillator 123 wherein the signals modulate master carrier frequency centered at about 250 KHz and this is fed to gated RF amplifier 124. Gating voltage to amplifier 124 is controlled by the output of OR gate 27 and comes on when ring signals are detected from the telephone line or when an off-cradle signal is detected by master receiver 25 and fed to master cradle-dial decoder circuits 28 (see FIG. 11). The transmitter is turned on when either of those events occurs and it feeds master carrier frequency centered at about 250 KHz modulated by whatever comes in on the telephone line 1. The modulation index is preferable about 1.5 and power is in the range of 25 milliwatts.

The master receiver 25 is shown by FIG. 10. It is constructed the same as extension receiver 32, except the input filter is centered at a lower frequency calculated to pass the extension carrier frequency (side band). This filter 131, is called the low pass filter, receives the output of power line hybrid 24, feeds it to RF amplifier 132 and then to FM demodulator 133, de-emphasis network 134 and audio amplifier 135. The output of amplifier 135 is fed to the telephone line 1 via interface 21. The output of RF amplifier 132 is also fed to carrier detection circuit 136 which produces in line 137 a voltage level indicative of the presence of absence of extension carrier frequency that is fed to decoder circuits 28. Initially, extension carrier frequency is transmitted when the extension telephone goes off-cradle and that transmission continues so long as the extension phone remains off-cradle, except during the intervals between dial pulses.

Figure 11:
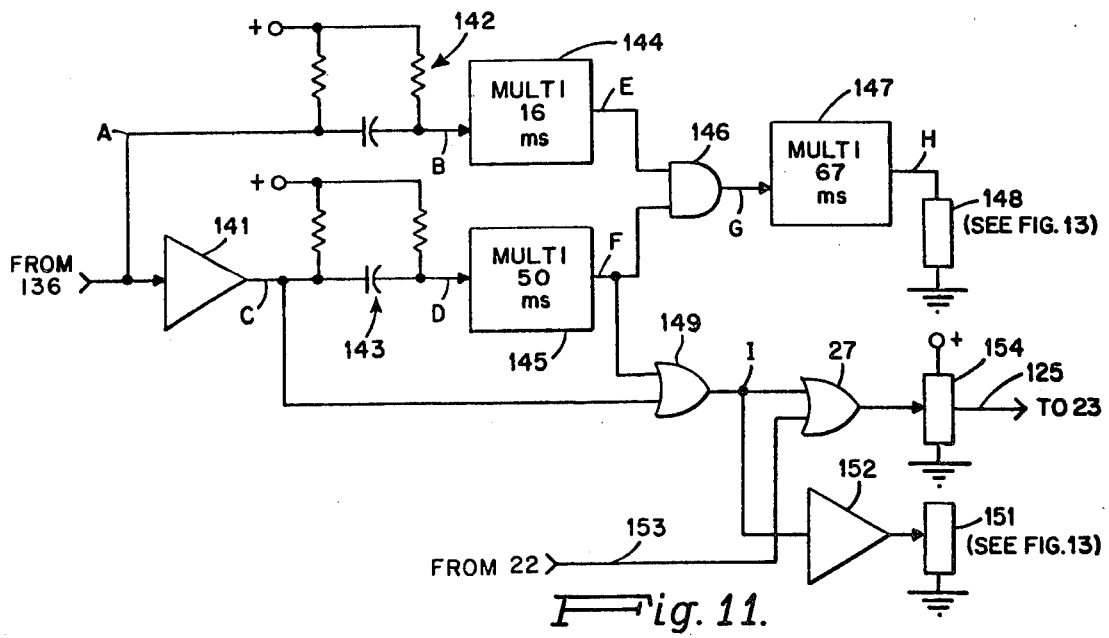
FIG. 11 is a combination circuit-block diagram showing elements of the master cradle-dial decoder circuits in the master linking circuit.

FIG. 11 shows in some detail the master cradle-dial decoder circuits 28. The off-cradle signal in line 137 from extension carrier detection circuit 136 is input to amplifier 141. This signal is represented by waveform A in FIG. 12. It includes the on-cradle level, the off-cradle level and dial pulses. This waveform is fed to differentiating circuit 142 and is inverted by amplifier 141 and fed to differentiating circuit 143. Thus, the output of amplifier 141 is represented by waveform C in FIG. 12 and the outputs of differentiating circuits 142 and 143 are represented by waveforms B and D, respectively, in FIG. 12. The negative impulses in signal B drive 16 ms monostable multivibrator 144 while those of signal D drive 50 ms monostable multivibrator 145. The outputs of these multivibrators are wave forms E and F, respectively and both are fed to AND gate 146 which produces wave form G that trigger 67 ms monostable multivibrator 147 producing the output waveform H for driving the dial relay 148 in the telephone interface 21 (see FIG. 13).

Waveform C from the output of amplifier 141 and waveform F from multivibrator 145 are fed to OR gate 149 producing waveform I that controls the cradle relay 151, via relay driver 152. Waveform I along with the ring gating signal in line 153 frofm ring detector 22 control OR gate 27 and the output of this gate controls DC voltage in line 125 to the master transmitter. For this purpose a relay 154 is provided feeding the DC voltage to the transmitter.

Thus, the master cradle-dial decoder circuits 28, described by FIGS. 11 and 12, upon receiving the extension carrier frequency at the master respond by producing spike impulses each time the extension carrier is turned on and off by on-and off-cradle and dialing impulses. The decoder circuit then reconstructs the dialing impulses producing waveform H that controls the dial relay 148 that interrupts the telephone line loop in accordance with proper impulse dialing requirements of that loop. The decoder also reconstructs the extension cradle signal producing waveform I that controls the cradle relay that opens and closes both the tip and ring lines of the telephone line 1 and so connects and disconnects the system to the telephone line loop. And, finally, the decoder turns on and off the master transmitter so that it is never on except when it is needed.

Referring again to FIGS. 11 and 12, it should be noted that the dial impulses received from the extension linking circuits and represented by waveform A may be considerably distorted compared to the originals generated by the extension telephone and they may be accompanied by considerable noise. Hence, invariably, the reconstruction is necessary. This is done by the decoder circuits 28 by defining as precisely as possible the leading and trailing edge of each dial pulse; then, constructing from the leading edges (waveform E) square pulses that are shorter than ideal dial pulses and, likewise, constructing from the trailing edges square pulses that are longer; then gating these together to produce pulses that are coincident with both (waveform G); and driving monostable multivibrator 147 with waveform G to produce the ideal pulses. For example, ideal dial pulses are produced at the rate of about ten per second with a 60–40 make-break ratio and so an ideal dial pulse causes the system to make with the telephone line for 60 ms and break for 40 ms.

By this technique, substantially the following is achieved:

1. If the make and break interval is less than 67 ms no dialing occurs.
2. If the break interval is greater than 50 ms, no dialing occurs.

Figure 13:
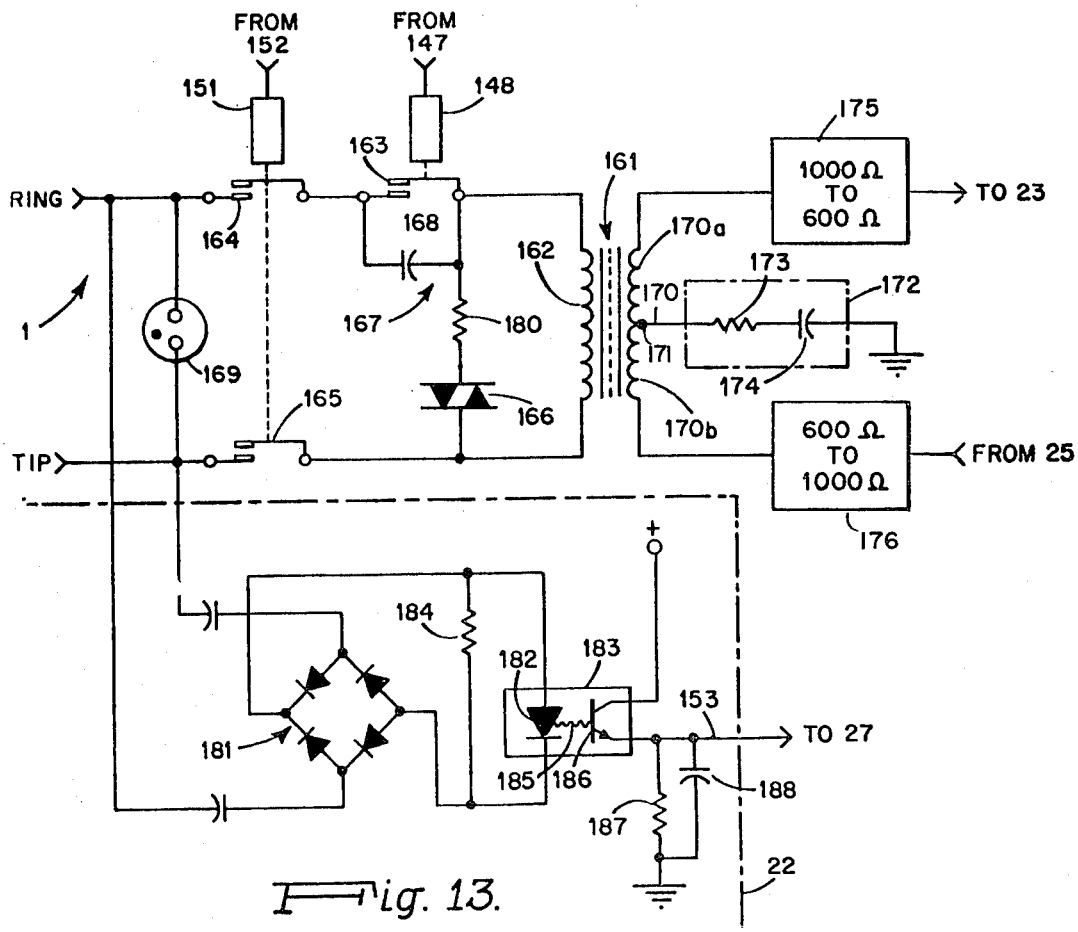
FIG. 13 shows electrical details of the telephone line interconnect circuit of the master linking circuits.

FIG. 13 shows details of the telephone line interface circuit 21 and ring detector circuit 22. This interface includes a transformer 161 having coil 162 connected across the ring and tip lines of the telephone lines 1. Coil 162 connects to the ring line through dial relay switch 163 and cradle relay switch 164, while the other end of the coil connects to the tip line of the telephone line through cradle relay switch 165. Thus, there is no connection from the transformer to the telephone line except when the extension telephone is off-cradle and all dialing impulses initiated by the extension telephone are imposed on the ring line of the telephone line. The combination of varistor 166, resistor 180 and capacitor 168 provides an RF filter 167, also called an equalizer circuit, across the tip and ring lines of the telephone line. The capacitor 168 suppresses dial pulse transients preventing them from causing radio interference and the resistor 180 and varistor 166 form the line equalizer that acts as a shunt on the telephone loop to limit the power transmitted to the telephone line and visa versa. Further protection of the telephone line is provided by gas tube 169 that is directly across the telephone line ring and tip lines. Any voltage surge that might get through the transformer 161, short circuits through the gas tube and so is not dissipated by the telephone line.

The other coil 170 of transformer 161 has a center tap 171 through a balanced network 172 to ground. This network may include for example, resistor 173 and capacitor 174 selected to balance the inductance of each side of coil 170. One side 170a of this coil feed the master transmitter through resistance pad 175, while the other side, 170b is fed from the master receiver through resistance pad 176. Thus, transformer 161 performs as a directional coupler and, more particularly, a two wire to four wire network.

The ring detector circuit 22 is connected across the ring and tip lines of the telephone line at opposite sides of diode bridge full wave rectifier 181 that includes two pair of diodes all in the same direction, each pair across diode 182 in optoisolator 183. A load resistor 184 is also across the diode 182 in optoisolator 183. This diode emits radiation 185 when it conducts, that turns on transistor 186 in the optoisolator. When turned on, this transisitor draws DC current through load resistor 187. Thus, a ring impulse across the ring and tip lines of the telephone line, which may be a 20 Hz impulse, is recitified and energizes the optoisolator diode that illuminates the base of the optoisolator transistor, turning the transistor on for the duration of the ring impulse, raising the signal level in line 153 to the ring impulse signal level for the duration of the ring impulse. Capacitor 188 smooths any 20 Hz ripple on this impulse.

The optoisolator isolates the telephone line from all electrical circuits of the system beyond the optoisolator diode and so any electrical surges or malfunctions that may occur are not fed back through the optoisolator to the telephone line. Similarly, gas tube 169 protects the telephone line from failure and surges that could produce a high current impulse due to any malfunction of the system or failures fed through transformer 161 to the telephone line.

The master and extension linking systems described herein, as already mentioned are somewhat symmetrical and inclues some sub-systems that may be interchangeable. For example, the power line hybrids 24 and 31 may be interchangeable, the receivers 25 and 32 can be constructed very similar, differing only in the pass band of the input filter and the transmitters 23 and 34 can be very similar, differing only in the center frequency of their carrier frequency oscillator.

The master linking circuits connect to the conventional telephone line through the interface 21 which is a directional coupler and the extension linking circuits connect to the conventional extension telephone by interface 33 which is also a directional coupler. The transformers in these interfaces can be the same. The master and the extension ring and cradle-dial decoder circuits, however have different purposes and functions. These circuits in the master reconstruct dial impulses and insert them on the telephone line. They are reconstructed for reliability and to meet requirements of signalling to the telephone line. At the extension, ring signals from the telephone line are reconstructed for driving the bell circuit in the extension telephone. As a result, the signals fed to the telephone and signals fed to the telephone line are in all respects conventional and not particularly distinguishable from signals of the same sort that occur during use of a conventional extension telephone plugged directly into a conventional telephone line.

Conclusion

The single embodiment of the present invention described herein provides a conventional extension telephone as the transmit-receive device. Clearly, features of this system, with some modification, may be employed to form other embodiments wherein the transmit-receive device is not a conventional extension telephone. For example, it may be a transponder integrated with a utility meter, such as an electric meter, to generate and transmit electric meter date from the meter location, over the AC power wires to the telephone line, in response to incoming interrogating telephone calls. Other embodiments will be apparent to those skilled in the art without departing from the spirit and scope of the invention as set form in the appended claims.

What is claimed is:

1. A power line telephone extension system for carrying electrical signals between a subscriber's telephone line of a conventional telephone communication system and the subscriber's extension telephone over available electric power wires comprising,
    (a) a master location including master linking circuits for processing the signals, electrically coupled between the subscriber's telephone line and power wires,
    (b) an extension location along said power wires including an extension telephone having a tip line and extension linking circuits for processing the signals, electrically coupled between the extension telephone and power wires and
    (c) a directional coupler electrically coupled between the extension linking circuits and the extension telephone,
    (d) the directional coupler including first and second coils inductively coupled together
    (e) the first coil being in electrical series with the extension telephone tip line and
    (f) the second coil being coupled at one end to a first signal flow path in the extension linking circuits and at the other end to a second signal flow path in the extension linking circuits,
    (g) whereby the power wires carry the electrical signals between the subscriber's telephone line and extension telephone and signals from the extension telephone to the telephone line flow along the first path while signals from the telephone line to the extension flow along the second path.

2. A system as is claim 1 wherein,
   (a) first and second signal flow paths are also provided in the master linking circuits,
   (b) means are provided for coupling each of the master signal flow paths to the power wires,
   (c) means are provided for coupling each of the extension signal flow paths to the power wires and
   (d) means are provided for coupling each of the master signal flow paths to the telephone line
   (e) whereby signals from the telephone line are carried along one master signal flow path, the power wires and one extension signal flow path, through the extension directional coupler to the extension telephone and signals are carried from the extension telephone through the directional coupler, along the other extension signal flow path, over the power wires and along the other master signal flow path to the telephone line.

3. A system as in claim 2 including:
   (a) an extension transmitter in the first extension signal flow path and an extension receiver in the second extension signal flow path and
   (b) a master receiver in the first master signal flow path and a master transmitter in the second master signal flow path,
   (c) whereby the extension transmitter transmits to the master receiver and the master transmitter transmits to the extension receiver.

4. A system as in claim 3 wherein,
   (a) master and extension power supplies are provided for powering the master transmitter and receiver and the extension transmitter and receiver respectively,
   (b) power is provided at all times to the master receiver and the extension receiver.

5. A system as in claim 4 wherein,
   (a) means are provided at the extension location for feeding power from the power supply to the extension transmitter when the extension telephone is off-cradle and
   (b) means are provided at the master location for feeding power from the power supply to the master transmitter when a ring signal appears on the telephone line and when the extension telephone is off-cradle.

6. A system as in claim 5 wherein said last mentioned means at the master location turns on the master transmitter during the entire interval the extension telephone is off-cradle.

7. In a power line telephone extension system for carrying electrical signals including dial pulses that define, make and break time intervals between a subscriber's telephone line of a conventional telephone communication system and the subscriber's extension telephone over available electric power wires, wherein there is a master location including master linking circuits for processing the signals, electrically coupled between the subscriber's telephone line and power wires, and an extension location along said power wires including an extension telephone and extension linking circuits for processing the signals, electrically coupled between the extension telephone and power wires, the improvement comprising,
   (a) means at the master location for detecting the edges of dial signal pulses received from the extension location and a monostable multivibrator set to operate in its unstable state for a predetermined time interval, and
   (b) means for imposing the monostable multivibrator output dial pulses of predetermined time interval on the telephone line, wherein
   (c) both the leading and trailing edges of the dial pulses are detected,
   (d) the leading edges trigger means for generating pulses shorter than the break interval between the ideal make interval,
   (e) the trailing edges trigger means for generating pulses longer than the break interval between the ideal make interval,
   (f) means are provided for producing pulses coincident with said shorter and longer pulses and
   (g) means are provided for applying said coincident pulses to said monostable multivibrator.

8. A power line telephone extension system for carrying electrical signals between a subscriber's telephone line of a conventional telephone communication system and the subscriber's conventional extension telephone over available electric power wires, comprising:
   (a) a master location including master linking circuits for processing the signals, electrically coupled between the subscriber's telephone line and power wires,
   (b) an extension location along said power wires including said conventional extension telephone and extension linking circuits for processing the signals, electrically coupled between the extension telephone and power wires,
   (c) the electrical signals include an extension telephone off-cradle signal originating at the extension telephone,
   (d) means are provided at the master location for detecting the edges of said cradle-off signal and producing a signal level representative thereof,
   (e) switching means are provided coupling the master linking circuits to the telephone line, said switching emans being controlled by said signal level representative of cradle-off, and
   (f) means at said extension location for generating dial pulses, and
   (g) means at the master location for detecting both the leading and trailing edges of the dial pulses, and wherein:
     (i) the leading edges trigger means for generating pulses shorter than the break interval between said interval,
     (ii) the trailing edges trigger means for generating pulses longer than said break interval between said interval,
     (iii) means are provided for producing pulses coincident with said shorter and longer pulses, and
     (iv) means are provided for applying said coincident pulses to said monostable multivibrator.

9. In a power line telephone extension system for carrying electrical signals including ring signals between a subscriber's telephone line of a conventional telephone communication system and the subscriber's extension telephone over available electric power wires, wherein there is a master location including master linking circuits for processing the signals, electrically coupled between the subscriber's telephone line and power wires and an extension location along said power wires including an extension telephone an extension ringer and extension linking circuits for processing the signals, electrically coupled between the extension telephone and power wires, the improvement comprising, (a) at the master location a master transmitter generates and transmits master carrier frequency to the extension location and said ring signals are detected in a ring detector circuit and turn on the master transmitter during the interval of each ring signal, (b) all signals carried to the extension location from the master location are carried by a master carrier frequency, (c) means at the extension location for detecting the occurrence of the master carrier frequency originating from the master transmitter, (d) means responsive thereto for generating an oscillating signal substantially coincident with said occurrence, the frequency of said oscillating signal and the power thereof being suitable for driving the extension ringer, and (e) means for coupling said oscillating signal to the extension ringer.

* * * * *